Figure 5:
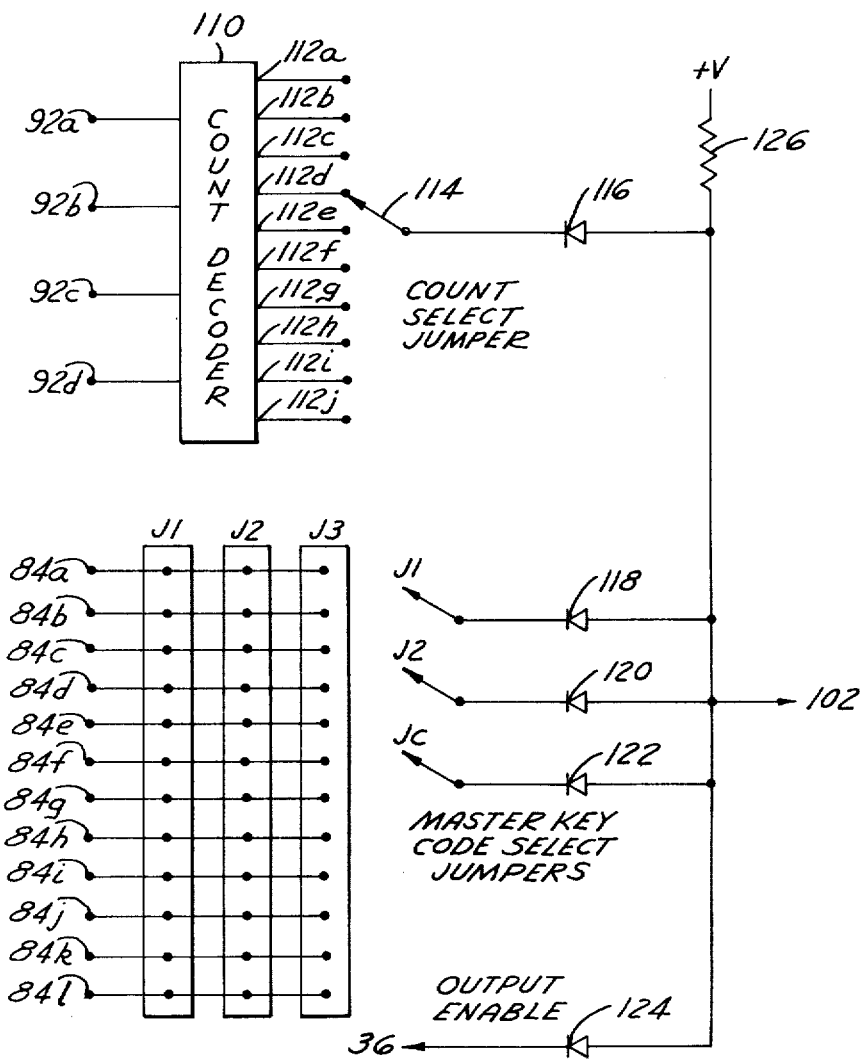

United States Patent [19]

Schasser

[11] 4,213,039
[45] Jul. 15, 1980

[54] DYNAMIC CARD READER

[75] Inventor: Donald S. Schasser, Pontiac, Mich.

[73] Assignee: Automatic Parking Devices, Inc., Farmington, Mich.

[21] Appl. No.: 951,760

[22] Filed: Oct. 16, 1978

[51] Int. Cl.² .................. G06K 7/08; G06K 19/06; G11B 25/04; G11B 5/38
[52] U.S. Cl. .................. 235/449; 235/493; 360/2; 360/112
[58] Field of Search .............. 235/449, 450; 360/112, 360/2

[56] References Cited
U.S. PATENT DOCUMENTS

| | | | |
|---|---|---|---|
| 2,952,008 | 9/1960 | Mitchell et al. | 340/174 |
| 3,419,710 | 12/1968 | Mathews et al. | 235/449 |
| 3,513,298 | 5/1970 | Riddle et al. | 235/449 |
| 3,556,274 | 1/1971 | Nizuta et al. | 209/74 |
| 3,598,965 | 8/1971 | Ano et al. | 235/449 |
| 3,634,657 | 1/1972 | Ballard et al. | 235/449 |
| 3,676,644 | 7/1972 | Vaccaro et al. | 235/449 |
| 3,700,862 | 10/1972 | Snook et al. | 235/449 |
| 3,715,522 | 2/1973 | Tsukagoshi | 360/112 |
| 3,896,292 | 7/1975 | May et al. | 235/450 |
| 3,984,658 | 10/1976 | Cannon | 235/450 |
| 4,088,878 | 5/1978 | Schasser | 235/436 |
| 4,134,539 | 1/1979 | Hopkinson | 235/449 |

Primary Examiner—Daryl W. Cook
Attorney, Agent, or Firm—Barnes, Kisselle, Raisch & Choate

[57] ABSTRACT

A dynamic card reader adapted for use in reading information magnetically recorded on a card in two rows or tracks parallel to the longer dimension of the card. The information is read as the card is being inserted into the slot by two Hall effect sensors disposed in side-by-side relation at the entrance to the card slot. One row of magnet information generates a data signal and the other row generates a clock signal which is used to strobe the data signal into a shift register. The Hall sensors are connected to the detection circuitry through differentiating capacitors, such that the detection circuitry is responsive to transition of magnetic polarities as the card is inserted into the slot.

17 Claims, 5 Drawing Figures

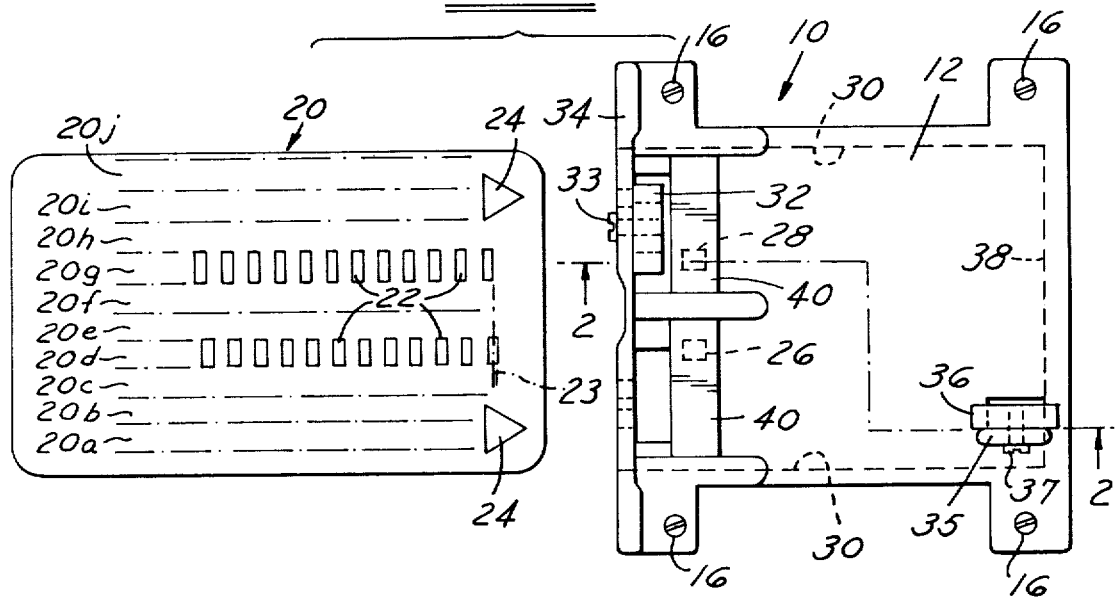
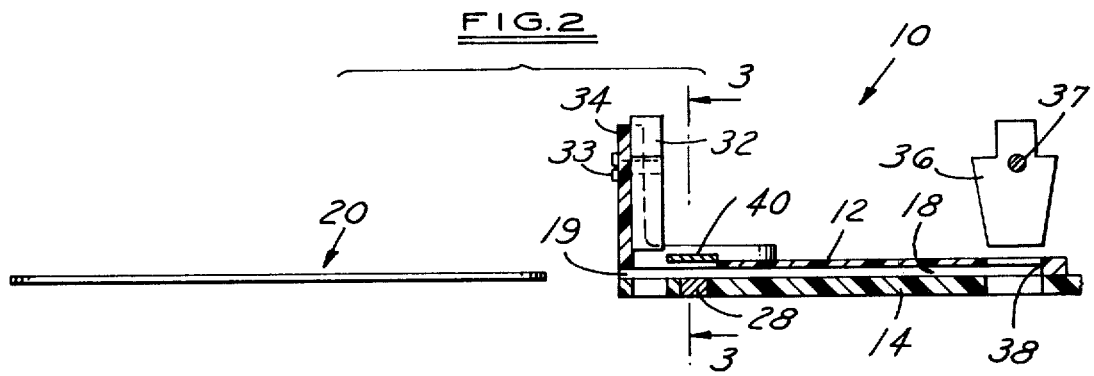
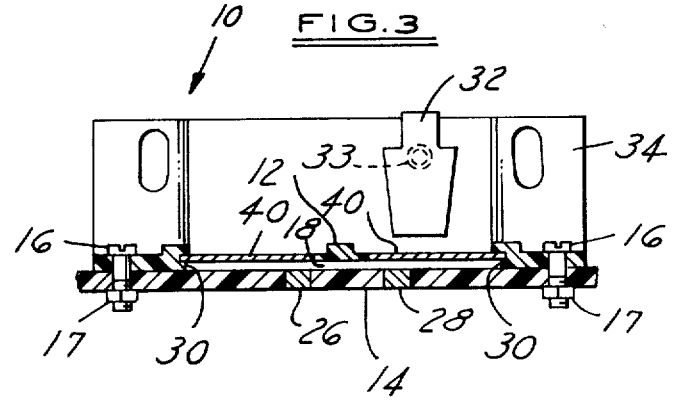

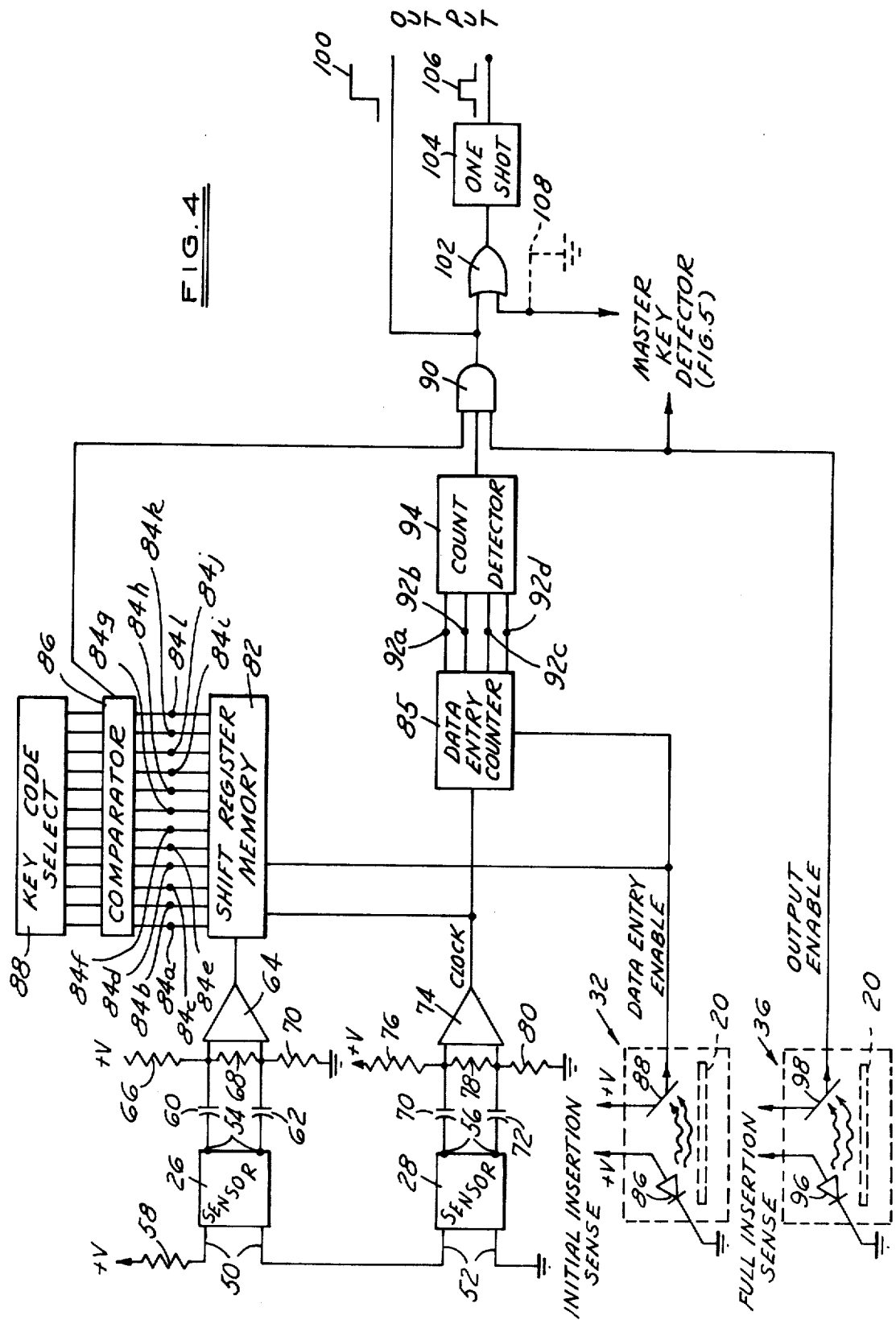

DYNAMIC CARD READER

The present invention relates to card readers, and more particularly to improvements in readers for use with cards carrying indicia at preselected locations thereon readable in the form of a binary code. Yet more specifically, the invention relates to improvements in Hall effect readers for use with cards of the described type carrying indicia in the form of magnetized spots or zones.

Card readers of the described type, particularly those for use with magnetic cards, are presently enjoying substantial commercial success in a variety of locations or applications. The most popular of such card readers are of the static type wherein a card is inserted into a slot and held in fixed position while the indicia thereon in a plurality of zones is sensed or read by a corresponding plurality of sensors disposed adjacent the card slot. One reader of this type is shown and described in the earlier patent to the inventor herein U.S. Pat. No. 4,088,878. Other static readers of various types are disclosed in U.S. patents to be noted hereinafter.

Although static card readers of the described type, including that shown in the above-noted earlier patent to the inventor herein, have enjoyed substantial commercial success, such readers inherently possess a significant drawback in that a substantial number of relatively expensive sensors must be provided in order to adapt the reader for sensing a corresponding plurality of indicia zones. This economic drawback is particularly acute in the case of static readers using relatively expensive Hall effect sensor elements.

Accordingly, one object of the present invention is to provide a card reader which is less expensive to manufacture than are static card readers of the type described above, and yet retains wide program or code adaptability. More specifically, it is an object of the present invention to provide a Hall effect card reader which utilizes a reduced number of Hall effect sensor elements for reading magnetically coded indicia on a card.

A further object of the invention is to provide a Hall effect card reader which includes means for enhancing the magnetic effect of the magnetized card zones on the Hall sensor elements as the card is inserted into the card slot.

Yet another important object of the present invention is to provide a Hall effect card reader which produces a result similar to that of the reader described and claimed in U.S. Pat. No. 3,634,657, but embodies substantially different and less expensive structure functioning in an entirely different mode of operation, and therefore not only improves upon but also avoids the claims of said patent.

The invention, together with additional objects, features and advantages thereof, will be best understood from the following description, the appended claims and the accompanying drawings in which:

FIG. 1 is a plan view illustrating a card reader in accordance with a presently preferred embodiment of the invention;

FIGS. 2 and 3 are sectional views approximately taken along the respective lines 2—2 in FIG. 1 and 3—3 in FIG. 2;

FIG. 4 is a partially schematic and partially functional block diagram of one presently preferred embodiment of the card reader electronics in accordance with the invention; and FIG. 5 is a partially schematic and partially functional block diagram of an optional modification to the embodiment of FIG. 4.

In FIGS. 1—3, a card reader 10 in accordance with the invention is illustrated as comprising the upper and lower card guide elements or plates 12,14 mounted to each other by the screws 16 and nuts 17 (FIG. 3) so as to define therebetween a planar slot 18 open at one end 19 for receiving the card 20. Card slot 18 is defined by the opposing planar surfaces of guide plates 12,14, laterally by the shoulders 30 and axially by the shoulder or lip 38. Preferably, shoulders 30,38 are integral with guide plate 12. Card 20 includes indicia in the form of magnetized zones or spots 22 located in one or more of the plurality of laterally adjacent recording tracks 20a–20j extending in a direction parallel to the longitudinal dimension of the rectangular card. In a particular embodiment illustrated in FIG. 1, the indicia 22 are recorded in tracks 20d and 20g, each zone 22 in track 20d being slightly offset as at 23 from the corresponding adjacent zone in track 20g in the forward insertion direction of the card (which is indicated by the arrows 24 printed on the upper card face).

The lower card guide 14 has mounted thereon adjacent the slot entrance or throat 19 a pair of Hall effect sensors 26,28 in side-by-side relation with respect to the direction of entry of a card into slot 18. Sensors 26,28 are equidistant from shoulder 38, which forms a card stop, and are laterally spaced with respect to each other and with respect to the lateral guiding shoulders 30 in positions corresponding to the lateral positions of selected recording tracks 20a–20j on card 30. Thus, the selected positions of sensors 26,28 define the particular card tracks 20a–20j to which the reader is responsive, in this case tracks 20d and 20g in which the spots 22 are recorded. A first optical reflection sensor 32 is mounted by the screw 33 on a flange 34 projecting upwardly from card guide 12 at card throat 19, sensor 32 being positioned above the card slot immediately adjacent the entrance. A second optical reflection sensor 36 is mounted by a screw 37 to an upwardly projecting tab 35 above the rearward end of card slot 18, which is to say immediately adjacent card stop shoulder 38. Upper and lower card guides 12,14 are coaxially apertured (FIG. 2) beneath sensors 32,36. Thus, reflective sensors 32,36 are respectively responsive to initial insertion and full insertion of a card 20 into slot 18, as will be explained in greater detail hereinafter. Sensors 26,28 are old per se, and preferably comprise model 703B sensors purchased from Optron Corp. of Corrollton, Texas.

Card guide 14 is of insulating material and preferably comprises a printed circuit board suitably etched and drilled for mounting Hall sensors 26,28 thereon. Card guide 12 is preferably of molded plastic construction. In accordance with one important feature of the invention, a strip or plate 40 of magnetically permeable material such as soft steel is molded into upper card guide 12 at a position therein which will lie in assembly across card slot 18 from sensors 26,28 with no plastic material disposed therebetween. It has been found that magnetically permeable strip 40 significantly enhances or amplifies the effect of the magnetic zones 22 on sensors 26,28 as the card is inserted into the slot, and thereby increases the overall reliability of the reader. Preferably, plate 40 extends laterally across slot 18, so that a card guide 12 with plate 40 molded therein may be used in any reader regardless of the selected lateral positions of sensors 26,28.

Referring to FIG. 4, Hall effect sensors 26,28 are of a well-known type characterized in that, during current flow therethrough in one direction through reference or bias electrode pairs 50,52, a potential is developed across corresponding signal electrodes pairs 54,56 in the presence of a magnetic field. The polarity of such potential relative to the reference or bias voltage depends upon the polarity of the magnetic field, i.e. whether north or south. In accordance with another important aspect of the present invention, the bias or reference electrodes 50 of sensor 26 are connected in series with the bias electrodes 52 of sensor 28 through a current limiting resistor 58 between a positive d.c. voltage source +V and electrical ground. This series connection arrangement has been found to enhance significantly the temperature response characteristics of the sensors and of the overall reader circuitry. The signal electrodes 54 of sensor 26 are connected through corresponding differentiating capacitors 60 or 62 to respective inputs of a differential amplifier 64. A voltage reference circuit consisting of three series-connected resistors 66,68 and 70 is connected to the differential amplifier inputs, the respective amplifier input lines being connected across resistor 68. Similarly, the signal electrodes 56 of sensor 28 are connected through corresponding differentiating capacitors 70 or 72 to a differential amplifier 74, and a reference voltage divider consisting of resistors 76,78 and 80 is connected across the amplifier input lines.

The output of amplifier 64 is connected to the data input of a shift register memory 82. The output of amplifier 74 is connected to the clock or strobe input of memory 82 and also to the clock input of a binary counter 85. Each sensor/amplifier combination 26/64 and 28/74 detects a transition or change in magnetic field polarity as magnetic indicia in the corresponding card track passes adjacent the sensor. Whether a particular sensor/amplifier combination is responsive to a transition to north or to south polarity depends, of course, upon the manner in which the sensor signal electrodes are connected to the differential inputs of the corresponding amplifier. Indicia in one recording track, specifically track 20d in FIG. 1, are treated as data signals and are strobed into memory 82 by clock signals generated by the other track, in this case track 20g. Offset of the data indicia in track 20d with respect to the clock indicia in track 20g permits the differentiated data indicia to achieve a relatively stable condition before being strobed into the shift register. Capacitors 60,62,70 and 72 are preferably fairly large, as on the order of 6.8 microfarads. Thus, binary coded data recorded at the preselected locations in card track 20d is serially clocked into shift register memory 82 and is presented in bit-parallel form at the memory output.

Each of the memory output lines is connected to a corresponding jumper terminal 84a–84l and to a binary digital comparator circuit 86. Comparator 86 is also connected to suitable circuit 88 for selecting a desired key code and presenting such code in binary bit-parallel form. Circuit 88 may comprise jumpers connected to the positive voltage potential (logical one) or to ground (logical zero) for permanently programming the reader, may comprise suitable switches for selectively programming the reader and simultaneously providing means for readily reprogramming the reader key code, or may comprise a memory connected by telephone lines or the like to a remote code selection center. The output of comparator 86, which switches from a logical zero to a logical one state when the code in memory 82 is equal to the selected code indicated by circuit 88, is connected to one input of an output-enabling AND gate 90. The bit-parallel outputs of counter 85, which provide a binary coded indication of the number of strobe or clock signals generated by sensor/amplifier combination 28/74, are connected through corresponding jumper terminals 92a–92d to a count detector circuit 94. Detector circuit 94 is responsive to a preselected number of clock or strobe signals to provide a logical one signal to a second input of AND gate 90. Thus, detector 94 senses entry of a preselected number of data bits into memory 82 by counting data entry clock pulses.

Reflective optical sensor 32 (FIGS. 1–3) includes an LED 86 connected between the positive voltage source and ground, and a phototransistor 88 having a collector connected to the positive voltage source and an emitter connected to the clearing inputs of memory 82 and counter 84 so as to clear memory 82 when no card has been inserted into slot 18 (FIGS. 2) and, conversely, to enable operation of the memory and counter only when the presence of a card 20 is detected at the entrance of card slot 18 and photo-transistor 88 is turned on. The third input to enabling AND gate 90 is provided by reflective optical sensor 36 which is identical to sensor 32, and includes an LED 96 and a phototransistor 98 responsive to full insertion of the card 20 into the card slot 18 (FIG. 2).

The output of gate 90 provides one reader output signal which switches from a logical zero to a steady logical one state, as indicated at 100, when such output is enabled by sensor 36, when comparator 86 indicates identity of the selected key code and the code in memory 82, and when the output of count detector 94 indicates that the preselected number of data signals have been strobed into memory 82. The output of gate 90 is also connected to one input of an OR gate 102. The output of OR gate 102 is connected to a suitable one-shot circuit 104 to provide a pulsed reader output indicated at 106 under the enabling conditions previously described. The reader outputs 100,106 may, of course, be fed to any suitable utilization circuit means designed or adapted to be responsive thereto. The second input of OR gate 102 may be connected to ground, as indicated in phantom at 108, or preferably is connected to an optional master key detection circuit illustrated in FIG. 5.

Thus, in the preferred embodiment of the invention illustrated in the drawings and thus far described, twelve data indicia appear in card track 20d (FIG. 1) and twleve strobe indicia are recorded in track 20g. Detector 94 (FIG. 4) is factory programmed to detect a count of twelve, and memory 82 possesses a twelve bit capacity. When the card has been fully inserted into slot 18 (phototransistor 98 turned on), twelve strobe signals should be detected and gate 90 will provide a logical one output if the twelve data bits loaded into memory 82 correspond to the code selected in circuit 88. It will be evident that a data "indicia" may comprise a magnetized spot of selected polarity such that transition thereto will be interpreted as a logical one at the output of amplifier 64, and either a magnetized spot of opposite polarity or no magnetic pole at all to represent a logical zero. A zero bit will be strobed into memory 82 whenever the output of amplifier 64 is low at the time when the strobe signal occurs. Each strobe signal must be represented by a corresponding magnetic spot in track 20g, all such spots being such that a strobe signal is generated at the output of amplifier 74 in response to the leading edge thereof.

Referring to FIG. 5, a count decoder circuit 110 has inputs connected to terminal 92a-92d at the bit-parallel output of data entry counter 85 (FIG. 4) and provides at its several outputs 112a-112j a plurality of decoded signals each indicative of a particular distinct numerical value of the binary coded signal in counter 84. A count select jumper 114 selectively connects the cathode of a diode 116 to one of the decoder outputs 112a-112j. Thus, jumper 114 programmably selects a desired data entry count represented by a logical one at the corresponding decoder output, all other outputs being zero. Similarly, the cathodes of diodes 118,120 and 122 are connected by the respective jumpers J1, J2 and J3 to selected terminals 84a-84l at the bit-parallel output of memory 82 programmably to select a particular three bit master code output from memory 82. A fourth diode 124 has its cathode connected to output enable sensor 36. The anodes of the several diodes 116-124 are connected together through a resistor 126 to the positive voltage source and to the second input of OR gate 102.

In the operation of the master key detect circuit illustrated in FIG. 5, assume that jumpers J1-J3 are connected to the three low-order or least significant outputs of memory 82, i.e. to terminals 84a,84b and 84c. Count select jumper 114 may then be connected to any decoder output indicating a number of strobe signals equal to or greater than three, such as a count of five at output 112d. A master card will then consist of any card having only five strobe indicia in track 20g and having at least three logical one data indicia in locations corresponding to the last three strobe indicia. In such an event, five strobe signals will be indicated by decoder 110 to reverse bias diode 116, and the three low-order output terminals 84a-84c of memory 82, being at a high or logical one, will reverse bias diodes 118-122. When the card is fully inserted into the card slot, diode 124 will also be reversed biased, placing a logical one signal at the second input of OR gate 102 and thereby generating pulsed output 106. Note that steady-state output 100 will not be generated since AND gate 90 is not satisifed. Of course, if a steady-state output is desired with the master key option, such may be obtained at the output of OR gate 102.

The master key option of FIG. 5 adapts the subject lock to be installed, for example, in hotels, motels or the like. In this application, the code of a tenant's key card for a particular room may be selected by circuit 88 and readily changed should the tenant fail to return his key card after checking out. The maid, however, may have a master key coded to correspond with the master key option of FIG. 5 so as to provide entry to a number of rooms on a single floor. Thus, one master key card may enable entry on all rooms of one floor by having recorded thereon a particular three-bit master code which is common to all individual room key codes on that floor, but not enable entry to rooms on other floors. Provision of programmable jumpers 114 and J1-J3, as well as a multiplicity of recording tracks on key card 20, provides significant flexibility in this respect.

Although the invention has been described in connection with a presently preferred embodiment thereof, several alternatives and modifications are envisioned. For example, in its broadest aspects the invention is not limited to Hall sensing means 26 and 28, but may be made responsive to magnetically coded cards by using reed switches of the type illustrated in Sedley U.S. Pat. No. 3,581,030 or electromagnetic sensor coils of the type shown in Rogers et al U.S. Pat. Nos. 3,686,479 and 3,780,268. The card indicia may comprise raised embossments or the like on the card surface, in which case the sensors may comprise suitable switches activated by such embossments and of the type illustrated in Schinner U.S. Pat. Nos. 3,299,298 and 3,463,890.

Alternatively, the indicia may take the form of slots or holes punched at preselected locations in card 20, in which event the sensors may comprise photodetectors disposed across card slot 18 in registry with suitable light sources as taught by Douglas U.S. Pat. Nos. 3,383,513 and Gieringer et al 3,388,403.

Similarly, reflective optical sensors 32,36 may be replaced by mechanical switches, or by suitable Hall sensors connected to a memory latch and responsive to passage of a magnet at the forward edge of track 20a, for example, first to enable data entry as the card is initially inserted in the card slot and then to enable output gate 90 when the card reaches the fully inserted position. Manifestly, twelve data and clock indicia on card 20 is arbitrary, and greater or fewer may be provided in any one track. Likewise, more than two recording tracks could be utilized for enhanced information flexibility. For sample, clock indicia may be recorded in track 20g as described, with data indicia being provided in laterally aligned positions in tracks 20a and 20d. A second shift register memory may be provided, and each clock signal would strobe two data bits into memory. Twenty-four data bits would thus be generated. In like manner, jumper 114 (FIG. 5) may be replaced by a plurality of individual switches as taught by the above-noted patent to the inventor herein so as to render the master key option at one time selectively responsive to any one or more of the plurality of output signals from decoder 110. The invention is intended to embrace the foregoing and all other alternatives, modifications and variations as fall within the spirit and broad scope of the appended claims.

The invention claimed is:

1. In a Hall effect magnetic card reader which includes first and second Hall effect sensors each having a pair of bias electrodes for connection to a source of electrical power and a pair of signal electrodes for generation of a voltage signal in response to proximity of a magnetic field, the improvement comprising a source of dc potential and means connecting said bias electrodes of said first and second Hall effect sensors in series with each other across said source of dc potential.

2. The improvement set forth in claim 1 wherein said means includes current limiting resistance means.

3. In a Hall effect magnetic card reader for use with a card carrying magnetic indicia at preselected locations thereon, and including means providing a slot for receiving a card in a planar orientation such that said indicia is disposed in at least one track parallel to the direction of card insertion into said slot, at least one Hall effect sensor disposed adjacent said slot for providing a signal as a function of indicia on a card inserted into said slot and output means for providing a reader output signal as a function of said indicia, the improvement wherein said means for providing said slot includes means constructed of magnetically permeable material disposed adjacent said slot on a side thereof opposite said Hall effect sensor means for amplifying the effect of magnetic indicia on a said card inserted into said slot on said Hall effect sensor means.

4. The improvement set forth in claim 3 for use with a card carrying magnetic indicia selectively disposed in any one or more of a plurality of parallel tracks disposed laterally of each other wherein said reader includes a plurality of Hall effect sensors at locations corresponding to selected ones of said tracks, and wherein said means constructed of magnetically permeable material extends laterally across said slot so as to amplify the effect of magnetic indicia carried in any one of said tracks.

5. In a card reader for use with a card carrying indicia comprising magnetic zones in said card readable in the form of a binary code at preselected parallel track locations thereon and including means for providing a slot for receiving a card such that said track locations are parallel to the direction of card insertion into said slot and means disposed at preselected locations adjacent said slot and responsive to magnetic indicia on a card inserted into said slot for providing a binary coded signal as a function of said indicia, the improvement wherein said means comprises a plurality of magnetic sensor means disposed laterally of said slot one adjacent each said preselected parallel track location for providing sensor signals in response to proximity of magnetic indicia adjacent the corresponding said sensor means, output means for providing a reader output signal in response to said sensor signals and including input means for receiving signals from each said sensor means, said sensor means comprising Hall effect sensor each having a pair of signal electrodes for connection to said input means for providing said binary coded signal to said input means, and differentiating means comprising a pair of capacitors connected in series one between each of said electrodes and said input means such that said output means is responsive to dynamic changes in magnetic polarity adjacent each said sensor means as a card is inserted into said slot.

6. In a card reader for use with card carrying magnetic zones for defining indicia readable in the form of a binary code at preselected locations thereon and including means for providing a slot for receiving a card in an orientation such that said indicia is disposed in at least one track parallel to the direction of card insertion into said slot, at least one sensor means disposed at a preselected lateral position adjacent said slot corresponding to the preselected location of the said at least one track on a card inserted into said slot for providing a binary coded signal as a function of said indicia, said sensor means comprising Hall effect sensor means having a pair of signal electrodes for providing said binary coded signal, and output means including input means for receiving signals from each said sensor means to provide a reader output signal as a function of said indicia, the improvement comprising a pair of capacitors connected in series one between each of said electrodes and said input means such that said output means is responsive to transition of said indicia from one state to another as a card is inserted into said slot.

7. A card reader for use with a card carrying indicia readable in the form of a binary code at first and second parallel preselected track locations thereon and including means for providing a slot for receiving a card in an orientation such that said tracks are parallel to the direction of card insertion into said slot, sensor means disposed at preselected lateral positions adjacent said slot corresponding to the preselected location of the said tracks on a card inserted into said slot for providing binary coded signals as functions of said indicia, output means for providing a reader output signal as a function of said indicia, and differentiating means connecting said sensor means to said output means such that said output means is responsive to transition of said indicia from one state to another as a card is inserted into said slot, said reader output means comprising serial binary data storage means connected to receive an input data signal from a first of said sensor means as indicia in a first of said tracks pass adjacent said first sensor means, clock means connected to a second of said sensor means for generating a clock signal to strobe data signals from said first sensor means into said storage means as indicia in the second of said tracks pass adjacent said second sensor means, counter means connected to said second sensor means for counting said clock signals up to a level corresponding to a selected number of data signals to be stored in said storage means, comparator means for comparing binary data signals stored in said storage means with a preselected code, and first gate means having a first input connected to said counting means and a second input connected to said comparator means for providing said reader output signal when both said count equals said selected number and said stored data equals said preselected code.

8. In a card reader for use with a card carrying magnetic indicia readable in the form of a binary code at first and second preselected parallel track locations thereon, and including means for providing a slot for receiving a card such that said track locations are parallel to the direction of card insertion into said slot and means disposed at preselected locations adjacent said slot and responsive to magnetic indicia on a card inserted into said slot for providing a binary coded signal as a function of said indicia, the improvement wherein said means comprises a plurality of magnetic sensor means disposed laterally of said slot one adjacent each said preselected parallel track location for providing sensor signals in response to proximity of magnetic indicia adjacent the corresponding said sensor means, output means for providing a reader output signal in response to said sensor signals and differentiating means connecting each said sensor means to said output means such that said output means is responsive to dynamic changes in magnetic polarity adjacent each said sensor means as a card is inserted into said slot, said reader output means comprising serial binary data storage means connected to receive an input data signal from a first of said sensor means as indicia in a first of said tracks pass adjacent said first sensor means, clock means connected to a second of said sensor means for generating a clock signal to strobe data signals from said first sensor means into said storage means as indicia in the second of said tracks pass adjacent said second sensor means, counter means connected to said second sensor means for counting said clock signals up to a level corresponding to a selected number of data signals to be stored in said storage means, comparator means for comparing binary data signals stored in said storage means with a preselected code, and first gate means having a first input connected to said counting means and a second input connected to said comparator means for providing said reader output signal when both said count equals said selected number and said stored data equals said preselected code.

9. The improvement set forth in claim, 8 or 7 further comprising first means disposed adjacent said slot and responsive to initial insertion of a card into said slot for enabling said storage means, and second means disposed adjacent said slot and connected to a third input of said first gate means, said second means being responsive to full insertion of a card into said slot for enabling generation of said output signal.

10. The improvement set forth in claim 9 wherein said output means further comprises master card sensor means including programmable means adapted for selective connection to said storage means and responsive only to selected data bits in said storage means, and second gate means connected to said second means and to said programmable means for generating said output signal independently of said first gate means when both a card is fully inserted into said slot and said selected data bits in said storage means are at a preselected level.

11. A card reader for use with a card carrying indicia readable in the form of a binary code at preselected locations thereon comprising means for providing a slot for receiving a said card, a number of sensor means selectively disposed at preselected locations laterally spaced from each other with respect to said slot so as to define a selected number of indicia reading tracks corresponding to said number of sensor means, serial binary data storage means connected to receive an input data signal from a first of said sensor means as indicia in a first of said tracks pass adjacent said first sensor means, clock means connected to a second of said sensor means for generating a clock signal to strobe data signals from said first sensor means into said storage means as indicia in the second of said tracks pass adjacent said second sensor means, counter means connected to said second sensor means for counting said clock signals up to a level corresponding to a selected number of data signals to be stored in said storage means, comparator means for comparing binary data signals stored in said storage means with a preselected code, first gate means having a first input connected to said counting means and a second input connected to said comparing means for providing a reader output signal when both said count equals said selected number and said stored data equals said preselected code, first means disposed adjacent said slot and responsive to initial insertion of a card into said slot for enabling said storage means, second means disposed adjacent said slot and connected to a third input of said first gate means, said second means being responsive to full insertion of a card into said slot for enabling generation of said output signal, and master card sensor means including programmable means adapted for selective connection to said storage means and responsive only to selected data bits in said storage means and second gate means connected to said second means and to said programmable means for generating said output signal independently of said first gate means when both a card is fully inserted into said slot and said selected data bits in said storage means are at preselected levels.

12. A card reader for use with a card carrying indicia readable in the form of a binary code at preselected locations thereon and including means for providing a slot for receiving a card in an orientation such that said indicia is disposed in at least two tracks parallel to the direction of card insertion into said slot, first and second sensor means disposed at preselected lateral positions adjacent said slot corresponding to lateral positions of the said tracks on a card inserted into said slot for providing binary coded signals as functions of said indicia, output means for providing a reader output signal as a function of said indicia and including input means for receiving separate input signals from said first and second sensor means, and differentiating capacitor means including first and second capacitors each connected in series between a corresponding one of said first and second sensor means and said input means for providing said input signals as independent functions of said indicia in said parallel tracks and responsively to transition of said indicia in each said track from one state to another as a card is inserted into said slot.

13. The improvement set forth in claim 12 wherein said indicia comprises magnetic zones in said card, wherein said sensor means comprise Hall effect sensors each having a pair of signal electrodes for connection to said input means for providing said binary coded signal to said input means, and wherein said capacitor means comprises a pair of capacitors connected in series one between each of said electrodes and said input means.

14. The improvement set forth in claim 12 wherein said reader output means comprises serial binary data storage means connected to receive an input data signal from a first of said sensor means as indicia in a first of said tracks pass adjacent said first sensor means and clock means connected to a second of said sensor means for generating a clock signal to strobe data signals from said first sensor means into said storage means as indicia in the second of said tracks pass adjacent said second sensor means.

15. The improvement set forth in claim 14 wherein said output means further comprises counter means connected to said second sensor means for counting said clock signals up to a level corresponding to a selected number of data signals to be stored in said storage means, comparator means for comparing binary data signals stored in said storage means with a preselected code, and first gate means having a first input connected to said counting means and a second input connected to said comparing means for providing said reader output signal when both said count equals said selected number and said stored data equals said preselected code.

16. The improvement set forth in claim 12 or 11 wherein said indicia includes magnetized zones on said card, and wherein said sensor means comprises Hall effect sensor elements.

17. For use in the combination of a card reader and a plurality of key cards, a method of programming the card reader to be selectively responsive to coded combinations of indicia recorded on key cards comprising the steps of (a) providing said card reader with a slot adapted to receive said key cards one at a time in a selected direction, (b) constructing said key cards to have a plurality of available laterally spaced recording tracks parallel to the direction of insertion into said slot, (c) recording coded indicia in at least some of said recording in each of said key card tracks, and (d) locating sensor means in said reader at preselected laterally spaced locations adjacent to said slot and corresponding in lateral position to selected ones less than the total of said plurality of recording tracks such that said sensor means are responsive only to ones of said key cards having a said coded combination of indicia recorded in said selected ones of said recording tracks.

* * * * *